United States Patent Office.

EDWARD L. SEYMOUR, OF NEW YORK, N. Y.

Letters Patent No. 71,230, dated November 19, 1867.

IMPROVEMENT IN THE MANUFACTURE OF CAST STEEL.

*The Schedule referred to in these Letters Patent and making part of the same.*

TO ALL WHOM IT MAY CONCERN:

Be it known that I, EDWARD L. SEYMOUR, of the city, county, and State of New York, chemist, have invented an improved Method of Manufacturing Cast Steel and Malleable Iron of a superior and uniform quality directly from ores; and I do hereby declare that the following is a full, clear, and exact description thereof.

Unless naturally found in a granular or pulverulent state, the ores must be stamped, crushed, or ground, that their various component parts may be as effectually as possible disintegrated, preparatory to the concentration of such ores, by appropriate mechanism, to their greatest richness and purity.

In order to be enabled, under all circumstances, to separate, with perfect certainty and greatest facility, the pure ores from the impure—that is to say, the carbonates and the peroxides or sesquioxides of iron from such oxides of the same as are combined with titanic, tungstic, chromic, and other acids, as well as from sulphurets and sulph-arseniurets, from sulphates, phosphates, silicates; in fine, from all noxious elements—I calcine the pulverized or granular ore in a furnace of convenient construction, at a white heat, for an hour or longer, and thus convert the hydrated and anhydrous peroxides, and the carbonates of iron, (which are not attracted by the magnet,) into magnetic oxides of iron, which enables me, after cooling the ore, to get rid of all impurities by the simple mechanism of revolving magnets, or their equivalent.

Pure oxides of iron, thus or otherwise obtained, I mix with the proper quantity of powdered charcoal, and then treat the mixture, for two hours or longer, at a strong red heat, in appropriate vessels or furnaces, till the iron has parted with all its oxygen in favor of the carbon, without entering into combination with the latter; in other words, I deoxidize or metallize the ore, without charging it with carbon, and without even a partial fusion or agglutination of the metallic particles. The object of this mode of metallization is to prevent the possibility of any loss of the metal by scorification or "slagging," (oxide of iron being absent, no silicate or scoriæ of iron can be formed,) and to enable me to combine the iron invariably with as little or as much carbon, of a given quality, as the nature and quality of the metal required to be obtained from the next process of fusion may demand. To prevent partial oxidation the metallized ore must be cooled without access of air.

After mixing the ore thus metallized with the necessary quantity of carbon, according to the quality and nature of the metal to be produced, I melt it (in close crucibles or other receptacles) in furnaces so constructed that the crucibles, vessels, or receptacles containing the metallized ore, mixed with the requisite proportion of carbon, cannot come into direct contact with either the burning fuel or the gases produced by the combustion of the same. I thus prevent the modifying and injurious action of these gases upon the quality of the metal, and its proper combination with the given quantity of the carbon, and put an end to the rapid destruction of the expensive crucibles or other vessels or receptacles, usually resulting from their immediate contact with burning coal and its impurities, and the sudden changes of the temperature of heat, and I am thus enabled at all times to obtain metal of uniform quality.

What I claim as my invention and improvement, and desire to secure by Letters Patent, is—

1. The conversion of the non-magnetic peroxides and carbonates into magnetic oxides of iron, in the manner and for the purposes specified.

2. The metallization of iron ores at a red heat, without fusion of the particles, as described and for the purposes stated.

3. The fusion of the metallized matter as described and for the purposes explained in the specification.

E. L. SEYMOUR.

Witnesses:
 J. B. HYDE,
 CHARLES WRIGHT.